Figure 1:
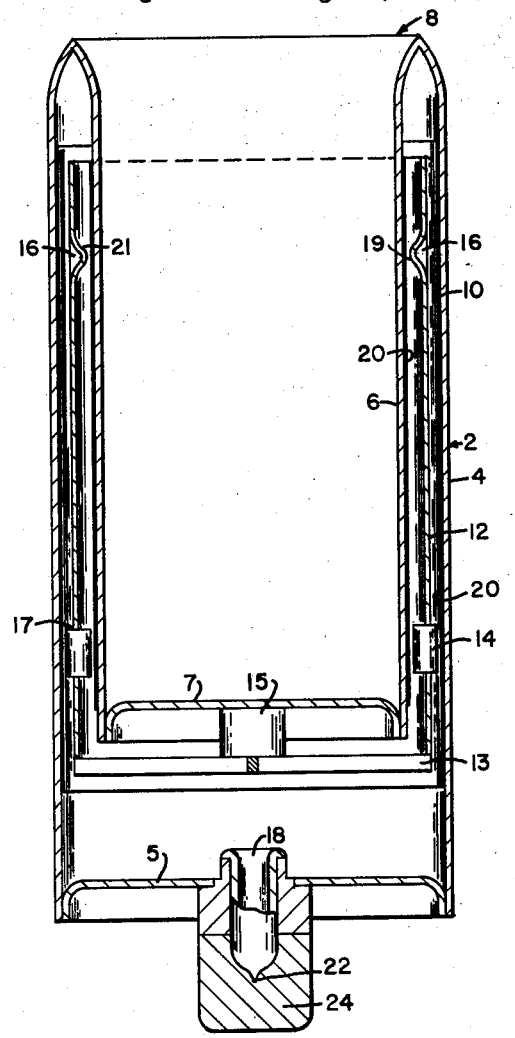

Sept. 22, 1964  R. A. BERGAN  3,149,741
VACUUM CONTAINER
Original Filed Aug. 23, 1956

INVENTOR.
R.A. BERGAN
BY
Robert K. Schumacher
ATTORNEY

United States Patent Office 3,149,741
Patented Sept. 22, 1964

3,149,741
VACUUM CONTAINER
Reuben Allard Bergan, Houston, Tex., assignor, by mesne assignments, to Dresser Industries, Inc., Dallas, Tex., a corporation of Delaware
Original application Aug. 23, 1956, Ser. No. 605,903, now Patent No. 3,055,101, dated Sept. 25, 1962. Divided and this application July 13, 1961, Ser. No. 123,888
2 Claims. (Cl. 220—10)

This application is a division of my copending application Serial Number 605,903, filed August 23, 1956, now Patent No. 3,055,101, for "Vacuum Container and Method of Processing Same."

This invention relates to static vacuum insulating containers and is particularly directed to novel vacuum containers for maintaining radioactivity detectors at substantially constant low temperatures during borehole logging operations in hot wells.

In the art of radioactivity well logging, measurements are made of radioactivity occurring in the formations surrounding a well to obtain various geophysical information. The instruments used for making such measurements often employ scintillation phosphors as radiation detectors. However, numerous problems are presented by the use of these devices.

The instruments in which the detectors are housed must be suspended by a cable and lowered many thousands of feet down a well. During such operations, the instrument frequently bumps against the sides of the well and may be subjected to temperatures as high as 400° F. Unfortunately, scintillation phosphors and some of the electronic equipment required, such as photomultiplier tubes, are sensitive to temperature changes and operate most effectively at constant temperature, preferably at 30° to 50° F. Thermal insulation is required, but there is very little space in well logging instruments since they are necessarily of restricted lateral dimensions in order to pass through the well. Ordinary insulating materials are insufficient. Consequently, it is necessary to provide highly efficient thermal insulation for these devices and is usually desirable to employ some form of refrigeration.

It has long been known that double walled containers are extremely useful for maintaining articles contained therein at low temperatures in atmospheres of higher temperatures, and it has been found heretofore that these devices could be improved considerably by evacuating the space between the walls of the container, as in Dewar flasks. By inserting a shield which will reflect thermal radiation between the walls, containers have been made which are satisfactory at moderate temperatures. However, it has been found that substantially all materials contain some gases, such as carbon dioxide, carbon monoxide, oxygen and nitrogen, and when the space between the walls of a container is highly evacuated, these gases tend to evolve from the material of the walls and degrade the vacuum, thus reducing the thermal insulating properties of the container. To overcome this, it is common to insert into the space between the walls a small quantity of charcoal which readily adsorb any gases evolved. Unfortunately, charcoal is effective only at extremely low temperatures, such as those obtained with refrigerants like liquid air, and flasks so made are used for containing liquid air when the ambient temperature is atmospheric. However, these refrigerants are very expensive and are not suitable for use in cooling well logging instruments, especially when the ambient temperature of the well approaches 400° F. Consequently, even the best metal vacuum containers of the prior art have been useful only at atmospheric temperatures. Above this limit, containers of glass, which may be more easily degassed, have been employed but these are much too fragile to withstand the rough treatment which well logging instruments must encounter. Moreover, Pyrex type glass, which will withstand prolonged exposure to high temperatures, have a high boron content. Boron has a high capture cross section for neutrons and boron flasks would interfere with the measurement of neutrons in radioactivity well logging.

The disadvantages of prior art vacuum containers are overcome with the present invention and novel methods of constructing metal vacuum containers are provided which tremendously increase the life and useful range of such devices. Thus, with the present invention, it is possible to construct metal vacuum containers which, employing only 300 grams of ice as a refrigerant, will keep the contents at temperatures of 30° to 50° F. for logging cycles as long as 10 hours, even at well temperatures of 300° to 400° F. Furthermore, the containers of the present invention are physically rugged and can undergo extremely rough treatment without developing leaks.

These advantages of the present invention are preferably attained by forming a double walled container of metal having a low thermal conductivity and a low emissivity and coating the inner walls of the container with an inorganic material which has an emissivity lower than that of the container and which is readily capable of adsorption of, or chemical combination with most of the gases normally occurring as impurities in metals. This is preferably accomplished by forming a thermally reflective shield of a metal having the desired properties and having a sufficiently high vapor pressure at degassing temperatures to cause deposition of the metal. The shield is preferably assembled in the space between the walls of the container and the assembly is then degassed by simultaneously heating the assembly and evacuating the space between the walls of the container. The deposited metal will serve as a getter to adsorb or combine with any evolved gas within the container, thus assuring long life and highly efficient thermal insulation of the container.

Accordingly, it is an object of the present invention to provide a novel vacuum container which is capable of sustained use at high temperatures.

Another object of the present invention is to provide a novel vacuum container which is mechanically rugged.

A further object of the present invention is to provide a novel means for maintaining high vacuum between the walls of vacuum containers for long periods of time and even at high temperatures.

A specific object of the present invention is to provide a novel vacuum container formed of metal having a low thermal conductivity and a low emissivity wherein the inner walls of the container are coated with an inorganic material which has an emissivity lower than that of the container material and which is readily capable of adsorption and chemical combination with gases.

Another specific object of the present invention is to provide a novel method of constructing vacuum containers comprising forming a double walled container of metal having a low thermal conductivity and a low emissivity, forming a shield of an inorganic material which has an emissivity lower than that of the container material and which is readily capable of adsorption of or chemical combination with gases, assembling the shield in the space between the walls of the container, and degassing the assembly by simultaneously heating and evacuating the space between the walls of the container.

These and other objects and features of the present invention will be apparent from the following description wherein reference is made to the figure of the accompanying drawing.

Figure 2:
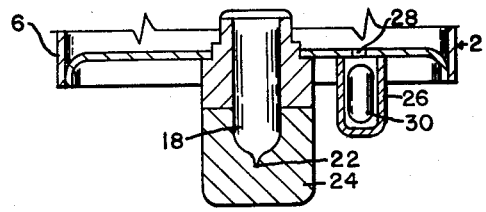

In the drawing:

FIGURE 1 is a vertical section through a typical vacuum container embodying the present invention; and FIGURE 2 is a sectional view of a portion of a modified vacuum container embodying the invention.

In that form of the invention chosen for purposes of illustration in the drawing, FIGURE 1 shows a double walled vacuum container 2 having an outer wall 4 and an inner wall 6 joined at the upper ends 8 thereof and having a space 10 therebetween. Preferably, walls 4 and 6 are cylindrical and have closure members 5 and 7 respectively closing the free ends thereof. If desired, the closure members may be integral with the walls. The walls 4 and 6 are preferably formed of metal having a low thermal conductivity and a low emissivity. Stainless steel having a minimum carbon content has been found to have these characteristics and is particularly well suited to use in well logging operations as it is strong enough to withstand the severe shocks encountered when the instrument strikes the wall of the well. In view of the high vacuum which must be maintained between the walls 4 and 6, it is preferable that all joints, such as that at 8, be welded with an inert-gas-shielded arc.

To reduce radiant heat transfer, a thermally reflective shield 12 is provided formed of an inorganic material which has an emissivity lower than that of the container 2 and which is readily capable of adsorption of or chemical combination with most of the gases normally occurring in metals. Copper is characteristic of such materials and is especially suitable as it is impervious to nitrogen, which is a major impurity of stainless steel. The emissivity of the various metals may be found in standard handbooks, such as Handbook of Chemistry and Physics, Chemical Rubber Publishing Company, 33rd Edition (1951–1952), page 2455. The shield 12 is positioned in the space 10 between the walls 4 and 6 of the container 2 and is secured to one wall of the container 2, in this instance, inner wall 6, in any suitable manner.

As seen in FIGURE 1, the shield 12 is mounted by suitable means, such as a spoked member or "spider" 13, formed of low conductivity inorganic material so as to provide a long path of low conductivity between the shield 12 and the wall 6 to which it is secured. In radioactivity well logging instruments where the lateral dimensions are restricted to permit passage of the instrument through a borehole, it may be preferable to secure the hub 15 to one of the closure members 5 and 7, which may be spaced farther apart than the cylindrical parts of walls 4 and 6. As a matter of convenience, the shield 12 is secured, as shown in FIGURE 1, to the closure member 5. However, to minimize conduction losses, the shield 12 should be secured to the wall having the least temperature differential with respect to the shield 12. If desired, stabilizing means, such as bumpers 14, formed of low conductivity inorganic material may be provided to position the free end of the inner wall 6 with respect to the outer wall. The bumpers 14 may be loosely mounted in windows 17 in the shield 12 similar to the mounting of roller bearings in a race. The bumpers 14 should be of slightly less diameter than the distance between the walls 4 and 6. In this way, the bumpers will have only intermittent contact with either wall and thermal transfer will be minimized. Centering means, such as dimples 16, may be employed to prevent the free end of shield 12 from contacting the outer wall 4 of the container. The dimples 16 are preferably small so that when those on one side, for instance, dimple 19, are in contact with the wall 6, those on the other side, such as dimple 21, will not contact the wall 6. However, the dimples should be large enough to prevent the shield 12 from engaging the wall 4 at any time. Preferably, the dimples 16 will be formed adjacent the upper end of the shield 12 and will engage the inner wall 6 at approximately the point of minimum temperature differential along the conduction path between inner wall 6 and outer wall 4.

After the shield 12 has been assembled in the container 2, a vacuum pump system equipped with suitable pressure gauges is connected to the exhaust tube 18 and the space 10 is evacuated to a desired pressure. In the case of a stainless steel container having a copper shield, this will be about $10^{-5}$ mm. of mercury as indicated by a gauge at the mouth of the exhaust tube 18. At the same time, the container 2 is heated gradually until most of the impurity gases have been driven out of the various materials. During this procedure, the temperature and pressure must be carefully controlled to prevent damaging the surfaces of the walls 4 and 6 and the shield 12. For a stainless steel container having a copper shield, this requires heating the assembly to a temperature of 900° to 1400° F. while never allowing the pressure at the exhaust tube 18 to exceed $10^{-4}$ mm. of mercury. Approximately 12 to 24 hours are required for this operation.

At the degassing temperature, several advantageous effects occur. In the first place, most of the impurity gases in the materials of the walls 4 and 6 and shield 12 will be driven out and will be pumped out of the exhaust tube 18 by the vacuum pump system. In addition, at any temperature above absolute zero ($-460°$ F.), the molecules of any material constantly undergo thermal agitation and some of the molecules at or near the surface of the material will escape into the atmosphere. The quantity of free molecules can be determined and is referred to as the "vapor pressure" of the material. As the temperature of the material rises, the thermal agitation and, consequently, the vapor pressure also rises. At degassing temperatures, the vapor pressure of any material is considerable. Thus, copper at 1270° F. has a vapor pressure of the order of $10^{-9}$ mm. of mercury. Consequently, there are a tremendous number of copper molecules flying about within the space 10. The vapor pressure of various metals at various temperatures is given in the Review of Scientific Instruments, Vol. 19, pages 920–922 (1948).

After the degassing temperature has been reached, the heat is removed and the assembly is allowed to cool. However, evacuation is continued during the cooling. Since the shield 12 is separated from the walls 4 and 6 of the container and the space 10 is evacuated, the walls 4 and 6 will cool much more rapidly than the shield 12. As the walls 4 and 6 cool, the free molecules of the shield material will adhere to these walls and will form a permanent visible coating 20 on the walls 4 and 6.

As stated previously, evacuation of the space 10 is continued after the heat has been removed and, as the assembly cools, the pressure within the space 10 will be reduced. When the pressure at the gauge on exhaust tube 18 indicates approximately $10^{-6}$ mm. of mercury, the tube 18 is closed off, as seen at 22, in any suitable manner and sealed, as by solder cap 24.

The vacuum container is then ready for use and the coating 20 on the walls 4 and 6 contributes greatly to the effectiveness of the device. The coating 20 and the surfaces of the shield 12 will be smooth and shiny and, therefore, will tend to prevent passage of radiant heat. Moreover, the coating 20 and the surface of the shield 12 will be highly active chemically and will readily adsorb or combine with any gas molecules which strike it. This action of the shield material will continue at some finite rate even after the container has been sealed, thereby maintaining the vacuum in space 10 and greatly extending the useful life of the container. In addition, with a stainless steel container having a copper shield, the copper coating on the walls 4 and 6 will be impervious to nitrogen, which is a major impurity in stainless steel. Consequently, the useful life of the container will be increased still further by preventing nitrogen in the steel from entering the evacuated space.

It has been found in practice that a container constructed in accordance with the present invention, provided with a suitable insulating closure, is capable of maintaining an inside to outside temperature differential of several hundred degrees for very long periods of time using only a small amount of refrigerant. Thus, such containers used in radioactivity well logging equipment and employing only about 300 grams of ice have been able to maintain an inside temperature of 30° to 50° F. throughout logging cycles of 8 to 10 hours even in wells having temperatures over 300° F.

A further advantage of the present invention resides in the fact that when, eventually, it becomes necessary to re-evacuate the space 10, the action of the shield material may be renewed by simply reheating the container to the degassing temperature during the re-evacuation operation.

In some instances, it may be necessary or desirable to provide a more efficient getter to further extend the life of the container or to permit rejuvenation of the vacuum in space 10 without re-processing the entire container. This may readily be accomplished by employing the modified container disclosed in FIGURE 2.

FIGURE 2 shows a portion of a vacuum container 2 which is substantially identical with that of FIGURE 1 but which has an air tight housing 26 mounted thereon in any suitable location. An opening 28 is formed in the outer wall 6 of the container 2 and connects the interior of the housing 26 with the space 10 inside the container 2. Within the housing 26, an ampule 30 is provided containing a getter material which preferably has a high vapor pressure at the maximum operating temperatures and has a relatively high mobility. The getter material should, obviously, be highly active chemically. Thus sodium has been found to be quite good.

The ampule 30 may be formed of substantially any inorganic material. However, the getter material must be free of impurities and the ampule 30 must be loaded and sealed in a vacuum. Furthermore, the ampule 30 must be able to withstand the processing operations, described above in connection with FIGURE 1, without releasing the getter material. Subsequently, when the gettering action is desired, the ampule may be broken either mechanically, for example, by crushing the housing 26, or thermally as by localized heating, to release the getter material. The getter material will then form a coating on the walls 4 and 6 and the surfaces of the shield 12 in substantially the same manner as described above for the coating 20. If necessary or desirable, the housing 26 may be locally heated to vaporize the getter material and to drive it through opening 28 into space 10. The material will then getter any gas which has evolved into the space 10 and the high vacuum will be restored. Like the shield material, the action of the getter may be renewed when necessary by heating the container sufficiently to vaporize the getter material.

If desired, the getter material may be released into space 10 of the container during the original processing of the container, instead of storing it in housing 26. Moreover, other means of storing and introducing the getter material may be employed. Numerous additional variations and modifications may also, obviously, be made without departing from the invention. Accordingly, it should be clearly understood that those forms of the invention described above and shown in the figures of the accompanying drawings are illustrative only and are not intended to limit the scope of the invention.

I claim:

1. A double walled vacuum container comprising inner and outer walls spaced apart and formed of metal having relatively low thermal conductivity and relatively low emissivity, the space between said walls being evacuated, a thermally reflective shield formed of gas sorptive metal having an emissivity less than that of said walls mounted between said walls within said space, and a gas sorptive and chemically active coating formed of the same material as said shield deposited on the facing surfaces of said walls.

2. A double walled vacuum container comprising inner and outer walls spaced apart and formed of stainless steel having minimum carbon content, the space between said walls being evacuated, a thermally reflective shield formed of gas sorptive copper mounted between said walls within said space, and a gas sorptive and chemically active coating of copper deposited on the facing surfaces of said walls.

References Cited in the file of this patent

UNITED STATES PATENTS

| | | |
|---|---|---|
| 1,204,838 | Bartlett | Nov. 14, 1916 |
| 1,315,624 | Fahnestock | Sept. 9, 1919 |
| 1,712,370 | White | May 7, 1929 |
| 1,738,991 | Fink | Dec. 10, 1929 |
| 2,547,607 | Sulfrian | Apr. 3, 1951 |
| 2,759,134 | Sullivan | Aug. 14, 1956 |

FOREIGN PATENTS

| | | |
|---|---|---|
| 330,342 | Great Britain | June 12, 1930 |